May 9, 1967  J. HUREAU  3,317,951

TUBE DRAWING APPARATUS

Filed Sept. 28, 1964

United States Patent Office 3,317,951
Patented May 9, 1967

3,317,951
TUBE DRAWING APPARATUS
Jacques Hureau, Paris, France, assignor to Society Generale Alimentaire, G.A.S.A., Neuilly-sur-Seine, France
Filed Sept. 28, 1964, Ser. No. 399,495
Claims priority, application France, Oct. 3, 1963, 949,458
11 Claims. (Cl. 18—1)

This invention relates to apparatus for both drawing lengthwise and stretching sideways a tube of synthetic material having any length.

Machines for drawing lengthwise strips or possibly tubes of flexible synthetic material having any length are known. These machines are provided before and after their drawing zones with drive means which impart to the strips or tubes drawing zone entry and exit speeds adjusted to the required extent of lengthwise drawing.

Some of these machines have been adapted simultaneously to carry out transverse stretching, but they can only be used for strips of synthetic material and not for tubes. In these latter machines, the side edges of the strips to be stretched are gripped by pincer-like members the spacing of which progressively increases as the strip progresses through the drawing and stretching zone. Such machines could therefore stretch tubes of flexible synthetic material sideways only by crushing the tubes in an axial plane so that not only would the two edge portions of the tube that are held in the jaws of the pincer-like members not be stretched, but what is more important the inner faces of the two tube walls would be applied against one another during stretching and would be likely to become permanently bonded to one another since the drawing and stretching operation of necessity requires the synthetic material to pass through the drawing and stretching zone in a plastic state such as by heating in the case of thermoplastic material.

The necessity for apparatus able to draw and stretch a synthetic material tube having any length both lengthwise and sideways has been essentially brought about by developments made in extruders which produce such tubes in a continuous manner, and particularly in those machines which directly produce in a continuous manner flexible tubes having thin walls that are at least partly perforated or reticulated. In order to fit these latter extruders with extrusion heads having a relatively small size, and which are hence relatively cheap to make, tube manufacturers have resorted to extruding tubes having relatively thick reticulated walls in which the "meshes" are of small size. The tubes are then transformed by drawing and stretching lengthwise and sideways into tubes having much thinner walls with meshes of considerably larger size. This procedure is resorted to since to extrude such thin walled tubes directly would have required extremely large and hence costly extrusion heads, their high cost inter alia due to the difficulty of machining extrusion slots of practically capillary size. French Patent No. 1,303,014 applied for on July 10, 1961, discloses a machine of this kind and with which the tube drawing and stretching apparatus according to the present invention is particularly intended to cooperate although it can also cooperate with any other kind of extruder designed to produce in a continuous manner synthetic material tubes having full walls or at least partly perforated or reticulated walls.

Moreover, the drawing of synthetic material tubes has the dual advantage of reducing their weight per unit length without adversely affecting the physical and chemical properties of the material of which they are made, and of increasing the mechanical resistance of their walls in the direction of drawing because of the molecular alignments that take place in this direction. In the particular case of reticulated-walled tubes, referred to above, lengthwise drawing sideways stretching therefore improves the subsequent dimensional stability of the "ribs" delimiting the meshes of their walls.

According to the present invention, there is provided apparatus for both drawing lengthwise and stretching sideways a tube of synthetic material having any length, comprising a tube drawing and stretching zone with entry and exit points, first drive means ahead of said entry point for imparting to the tube a given speed, second drive means past said exit point for imparting to the tube a speed greater than said given speed, the difference in speeds determining the extent of lengthwise drawing, a core in the path of said tube and having a frustro-conical body in said zone between said entry and exit points and over which the tube is pulled lengthwise, during operation, for sideways stretching in a plastic condition by said second drive means, the smaller end of said core body being located at said entry point and the larger end of said core body being located at said exit point, and a pair of laterally spaced abutment means on opposite sides of the tube path between said exit point and said second drive means and cooperating, during operation, through the tube wall with a portion of said core to maintain said core body between said zone entry and exit points against the pulling action of said second drive means.

For a better understanding of the invention and to show how the same may be carried into effect, one embodiment thereof will now be described by way of example with reference to the accompanying drawings, in which.

Figure 1:
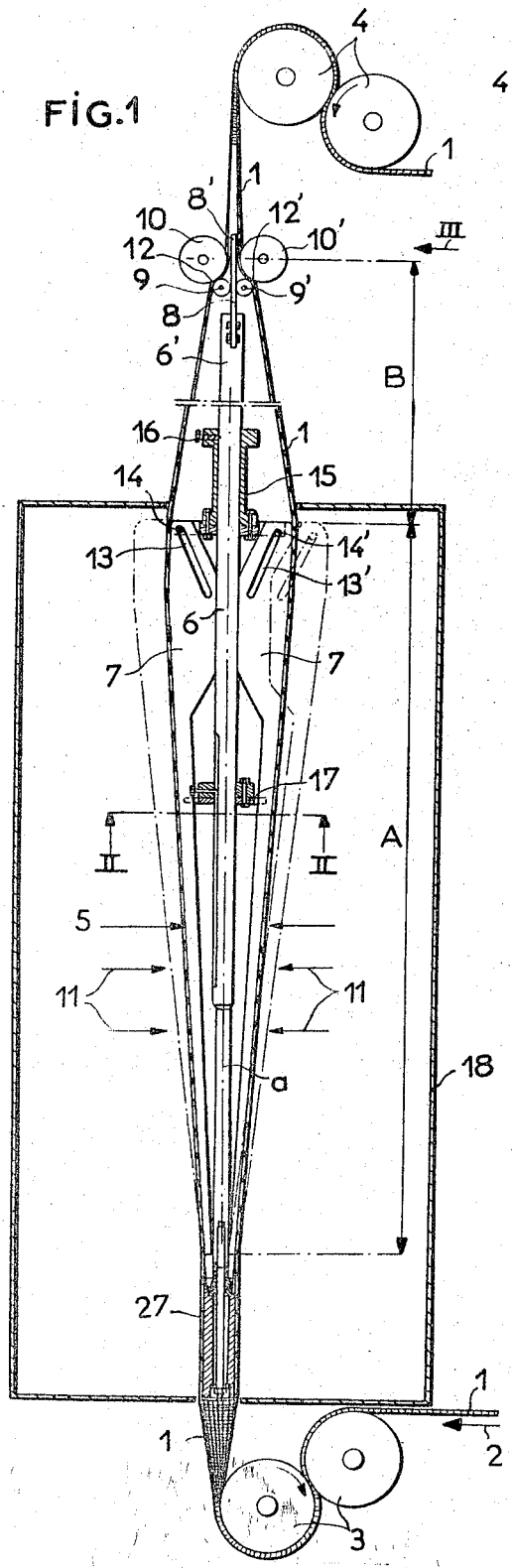
FIGURE 1 is an elevational view showing the stretching core in axial section.
Figure 3:
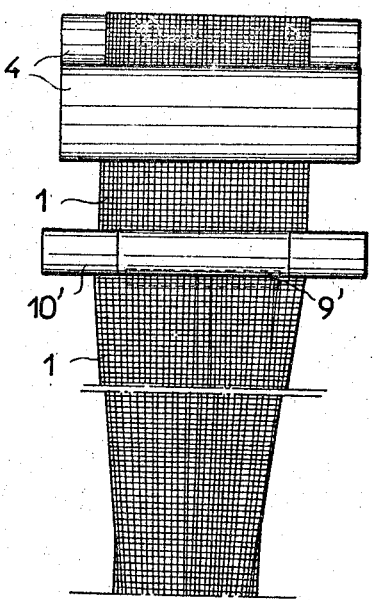
FIGURE 3 is a side view of the upper portion of the apparatus shown in FIGURE 1 viewed in the direction of arrow III.

In the illustrated embodiment, the tube 1 to be drawn and stretched is of flexible thermoplastic material and is shown with a fully reticulated wall, although it could also have a full wall. This tube travels in the direction of arrow 2 and is assumed to issue, for example, from an extruder. Means 3 and 4 for driving the flexible tube 1 are respectively positioned before and after the drawing and stretching zone A so as to cause the tube to travel through this zone vertically and upwardly along an axis $a$. In the illustrated embodiment the drive means 3 and 4 respectively consist of sets of notched rollers driven by motors, not shown, so as to rotate tangentially about horizontal parallel axes and thus drive frictionally the tube 1 passing therebetween in a flattened condition. The drive means 3 and 4 are adapted in known manner to impart to the tube 1 at the entry and exit points of zone A speeds which are adjusted to the required extent of longitudinal drawing. In other words, to lengthen the tube by X%, the tube must be drawn by the drive means 4 located after zone A at a speed X% greater than the speed imparted to this same tube by the drive means 3 located ahead of zone A. A frusto-conical core body 5 is placed in the drawing and stretching zone so that its axis may coincide with the vertical axis $a$ of this zone, the small and large bases of this core body being respectively positioned at the entry point (bottom) and at the exit point (top) of zone A. In the illustrated embodiment, the frusto-conical core body 5 consists essentially of an axial stem provided with a plurality of radial blades 7 the edges of which are inclined in relation to the axis of stem 6 and form the lateral surface of the frusto-conical core 5. At the bottom end of stem 6 there is secured a cylindrical member 27 having the same cross-sectional area as the small base of the core body and extending ahead of the entry point of zone A towards the drive means 3. The top end of stem 6 extends at 6' beyond the ends of radial blades 7, which form the large base of the frusto-conical core body and which coincide with the exit point of drawing zone A, towards drive means 4. At the end of the extended stem portion 6' is secured a thin plate 8 carrying by means of bearings, not shown in FIGURE 1, two rollers 9 and 9' mounted so as to rotate freely on opposite sides of plate 8 about transverse parallel axes. These rollers 9 and 9' abut through the tube wall against a pair of laterally spaced rollers 10 and 10' that are fixed in relation to drive means 3 and 4 to prevent upward shifting of the core. Rollers 10 and 10' are sufficiently widely spaced to enable not only the passage of flexible tube 1 in a flattened condition, but also that of extension 8' of plate 8 beyond rollers 9 and 9'. It should be noted that the core is perfectly free in relation to the drive means 3 and 4 and in relation to rollers 10 and 10' and that it is not supported by any mechanical means. In zone A are provided means for heating the tube 1 of thermoplastic material to its softening point. These heating means may consist of a thermal radiator which generates for example infra-red rays and the action of which has been schematically represented by arrows 11. To this same end, zone A can also be placed in a hot bath provided by a container 18, or steam may be circulated through zone A. In zone B extending between the exit point of zone A and rollers 10 and 10', the tube is cooled, for example simply by passing through the ambient air.

The above-described drawing and stretching apparatus operates as follows: the flexible tube 1 which reaches the drive means 3 in the direction of arrow 2, is preferably at ambient temperature, i.e., if it issues directly from the extruder, it is subjected to preliminary cooling. The tube 1, on the one hand, is pushed by drive means 3 on to the cylindrical member 27 of the core, acting as a guide preceding zone A, and, on the other hand, is pulled by drive means 4, located beyond zone A, at a higher speed thereby causing longitudinal drawing thereof, as explained earlier. In zone A, the tube 1 is heated to its softening point by the heating means therein provided, and is pulled in its plastic condition over the frusto-conical core body 5 in the direction of its increasing cross-section thereby automatically stretching it sideways to an extent determined by the sizes of the large base of the frusto-conical core body 5. Because of the friction of the tube wall against the lateral surfaces of the frusto-conical core body 5, i.e., in the illustrated embodiment, against the inclined free edges of blades 7, the core is subjected to considerable thrust in the longitudinal drawing direction, i.e. upwardly, thereby pressing the two rollers 9 and 9', mounted at the end of extension 6' and consequently located within the tube 1, against the fixed rollers 10 and 10' between which passes tube 1. Although the tube becomes somewhat flattened, the inner faces of the tube wall are not likely to adhere to one another since the tube is completely cooled upon leaving zone B. For the same reason, there is no likelihood of sticking in zones 12 and 12' where the wall of tube 1 passes between rollers 9–10 and 9'–10'. The extension 8' of plate 8 provides vertical guiding action of a sort for the core in the gap between the fixed rollers 10 and 10'. By way of modification, the core may be positioned above the fixed abutment rollers 10 and 10', the drawing and stretching operation then taking place in a downward direction. In any case, it is preferable that the drawing and stretching operation should take place vertically since this enables the weight of the core to be balanced either by the resultant of the frictional forces between the tube and the lateral surface of the frusto-conical core body, or by the support provided by the abutment rollers when occupying a downward position.

The constructional form of the above-described frusto-conical core body 5 is particularly advantageous for tubes of thermoplastic material having entirely reticulated walls since only the transverse "ribs" come to be positioned between the edges of the radial blades 7, thereby promoting the stretching of these transverse ribs, as well as the drawing of the longitudinal ribs since the latter do not generally cooperate with the blade edges and are not consequently subjected to any frictional force likely to prevent their being drawn or stretched. These advantages are all the more manifest when the number of radial blades 7 is larger. Of course, these radial blades may be replaced by rigid ribs or rods mounted between two base plates having different sizes in the manner of an umbrella frame. The use of a frusto-conical core body having an uninterrupted lateral surface, in particular for drawing full-walled tubes, also comes within the scope of the present invention.

Figure 2:
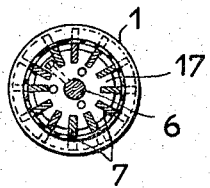
FIGURE 2 is a cross-section of the core taken along line II—II of FIGURE 1.

The embodiment illustrated in FIGURES 1 and 2 includes means for adjusting steplessly the percentage of sideways stretching to be achieved. These adjustment means consist in mounting the radial blades 7 forming the lateral surface of the frusto-conical core body 5, or the rigid rods with which they can be replaced, on the axial stem 6 in the manner of umbrella ribs thereby enabling them to have an adjustable inclination in relation to the axis of stem 6. In the illustrated embodiment, each radial blade 7 is formed, in particular at its end located at the large base of the frusto-conical core body 5, with a slot 13 inclined in relation to the axis of stem 6 through which extends a pin 14 carried by a slide member 15. This slide member 15 is mounted on the stem 6, in particular on its extension 6', and can be releasably locked thereon in any position, for example by a screw 16. Displacement of the slide member 15 along stem 6 enables radial blades 7 to pass from the position, shown in full lines, in which they contact the surface of stem 6 and in which transverse stretching is at a minimum, to the maximum spacing position, shown in broken lines, in which transverse stretching is at a maximum. The radial blades 7 are guided during movement by a transverse disc 17 (FIGURE 2) formed with radial open-ended slots and locked on stem 6.

The drawing and stretching apparatus according to the invention may be used not only for drawing and stretching tubes of thermoplastic material, as described hereinbefore, but also for drawing and stretching any material that can be reduced to a plastic condition, at least temporarily, in the drawing and stretching zone, whether or without heating. For example tubes, of which the walls, whether reticulated or not, are made of viscose, can be drawn and stretched with the apparatus illustrated in FIGURE 1 upon replacement of the hot water bath in container 18 by a bath of an appropriate solvent for softening the viscose.

I claim:

1. Apparatus for both drawing lengthwise and stretching sideways a tube of synthetic material having any length and at least partly reticulated walls, comprising first drive means for imparting to the tube a given speed, second drive means disposed apart from said first drive means for imparting to the tube a speed greater than said given speed, the difference in speed determining the extent of lengthwise drawing, a core body having a frusto-conical portion, which includes a circumferential series of stiff, elongated members, inclined in relation to the frusto-conical portion axis to define the frusto-conical surface of said portion, the larger end of said frusto-conical portion having an extension with a smaller cross-section than said larger end, and said core body being disposed in the path of the tube between said first and second drive means with the cross-section of its frusto-conical portion increasing from said first towards said second drive means, for the tube being pulled thereon lengthwise, during operation, for sideways stretching in a plastic condition by said second drive means, and a pair of laterally spaced abutment means on opposite sides of the tube path between said extension of the core body and said second drive means, and cooperating, during operation, through the tube wall with said core extension to maintain said core body between said first and second drive means against the pulling action of said second drive means.

2. Apparatus according to claim 1, wherein said pair of laterally spaced abutment means consist of a pair of freely rotating rollers mounted on fixed, parallel, transverse axes.

3. Apparatus according to claim 1, wherein at least one roller is mounted on the free end portion of said core extension for free rotation about a transverse axis and, acting, during operation, through said tube wall on said pair of laterally spaced abutment means.

4. Apparatus according to claim 3, wherein two rollers are mounted on the free end portion of said core extension for free rotation about a pair of parallel, transverse axes and respectively acting, during operation, through said tube wall, on said pair of laterally spaced abutment means, and wherein the free end portion of said axial extension is terminated by a flat guiding projection passing between said pair of laterally spaced abutment means.

5. Apparatus according to claim 1, wherein said stiff elongated members consist of radially disposed blades having their outer edges inclined in relation to the axis of the frusto-conical portion of the core body to define the frusto-conical surface of said portion.

6. Apparatus according to claim 1, wherein said stiff elongated members consist of rods inclined in relation to the axis of the frusto-conical portion of the core body to define the frusto-conical surface of said portion.

7. Apparatus according to claim 1, wherein said core body includes an axial stem on which said elongated members are carried and means for adjusting the inclination of said elongated members in relation to the core body axis.

8. Apparatus according to claim 7, wherein the adjustment means includes a sliding member mounted for releasable locking engagement on said axial stem, and coupling means are provided between said sliding member and the said elongated members, for transforming the sliding movement of said sliding member into a pivoting movement of said elongated members in relation to said axial stem.

9. Apparatus according to claim 8, wherein said elongated members consist of radially disposed blades, and said sliding member has a plurality of pins, each engaged in a slot formed in each radial blade, said slots having a same inclination in relation to said axial stem.

10. Apparatus according to claim 1, for drawing and stretching a tube of thermoplastic material, further comprising means for heating the tube to softening point between said first drive means and said larger end of the frusto-conical portion of said core body and for subsequently cooling the tube between said larger end of the core body and said pair of abutment means.

11. Apparatus according to claim 1, for drawing and stretching a tube of viscose or like material, further comprising a solvent bath between said first drive means and the larger end of the frusto-conical portion of said core body.

References Cited by the Examiner

UNITED STATES PATENTS

| | | | |
|---|---|---|---|
| 796,789 | 8/1905 | Adam | 249—180 |
| 1,563,580 | 12/1925 | May | 249—180 |
| 2,337,927 | 12/1943 | Reichel et al. | 18—14 |
| 2,668,324 | 2/1954 | Johnson | 18—14 |
| 2,761,336 | 9/1956 | Green et al. | |
| 2,903,743 | 9/1959 | Lysobey | 18—14 X |
| 2,910,961 | 11/1959 | McIntire et al. | 18—14 |
| 3,159,877 | 12/1964 | Orsini. | |
| 3,322,440 | 12/1965 | Murphy | 18—14 X |

FOREIGN PATENTS

| | | |
|---|---|---|
| 1,055,421 | 4/1959 | Germany. |
| 384,776 | 4/1963 | Japan. |
| 384,777 | 4/1963 | Japan. |

WILLIAM J. STEPHENSON, *Primary Examiner.*